United States Patent [19]

Shackleford

[11] Patent Number: 5,111,415
[45] Date of Patent: May 5, 1992

[54] ASYNCHRONOUS LEADING ZERO COUNTER EMPLOYING ITERATIVE CELLULAR ARRAY

[75] Inventor: J. Barry Shackleford, Sunnyvale, Calif.

[73] Assignee: Hewlett-Packard Company, Palo Alto, Calif.

[21] Appl. No.: 431,951

[22] Filed: Nov. 6, 1989

[51] Int. Cl.$^5$ ................................................ G06F 7/00
[52] U.S. Cl. ........................... 364/715.04; 364/715.10
[58] Field of Search .................. 364/715.04, 715.1, 748

[56] References Cited

U.S. PATENT DOCUMENTS

| | | |
|---|---|---|
| 3,234,368 | 2/1966 | Kregness . |
| 3,678,259 | 7/1972 | Kyser ................... 364/715.1 |
| 3,831,012 | 8/1974 | Tate . |
| 4,106,105 | 8/1978 | Pross, Jr. . |
| 4,247,891 | 1/1981 | Flynn et al. ............ 364/715.1 X |
| 4,586,154 | 4/1986 | Berry . |
| 4,785,421 | 11/1988 | Takahashi et al. ............. 364/715.04 |
| 4,794,557 | 12/1988 | Yoshida et al. ............ 364/715.04 X |
| 4,864,527 | 9/1989 | Peng et al. ................. 364/715.04 X |

OTHER PUBLICATIONS

IBM Technical Disclosure Bulletin, vol. 28, No. 2, July, 1985, pp. 854–855, "Circuit to Determine Number of Leading Zeros in a Binary String".

Primary Examiner—Dale M. Shaw
Assistant Examiner—Tan V. Mai

[57] ABSTRACT

A leading zero detector includes at least one asynchronous cell for receiving an input word and providing a data output indicative of the number of leading zeros in the input word. The cell may be cascaded with a plurality of like cells to define an array. The array is expandable for use with an input word of any bit width.

35 Claims, 3 Drawing Sheets

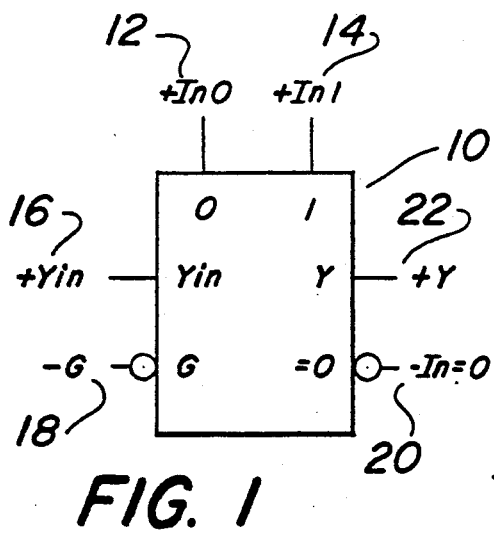
FIG. 1
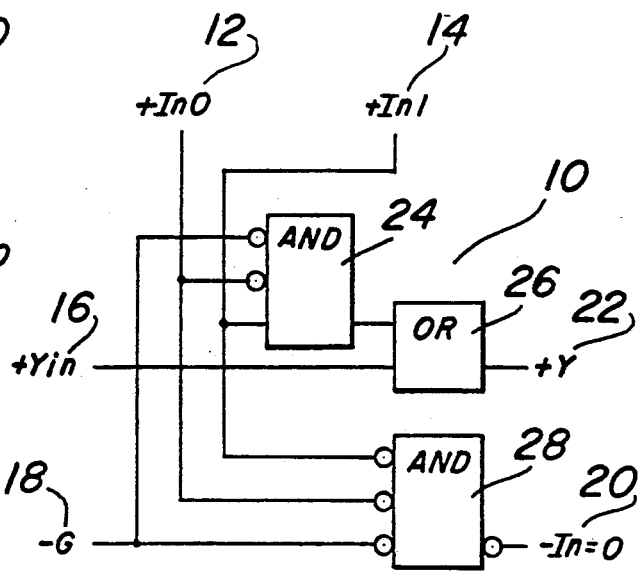
FIG. 3
| 18 | 16 | 12 | 14 | 22 | 20 |
|---|---|---|---|---|---|
| -G | +Yin | +In0 | +In1 | +Y | -In=0 |
| 1 | 0 | X | X | 0 | 1 |
| 1 | 1 | X | X | 1 | 1 |
| 0 | 0 | 0 | 0 | 0 | 0 |
| 0 | 0 | 0 | 1 | 1 | 1 |
| 0 | 0 | 1 | X | 0 | 1 |
FIG. 2
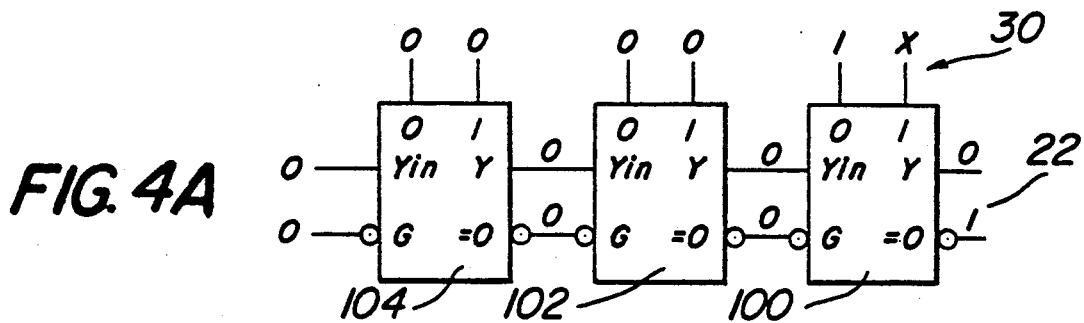
FIG. 4A
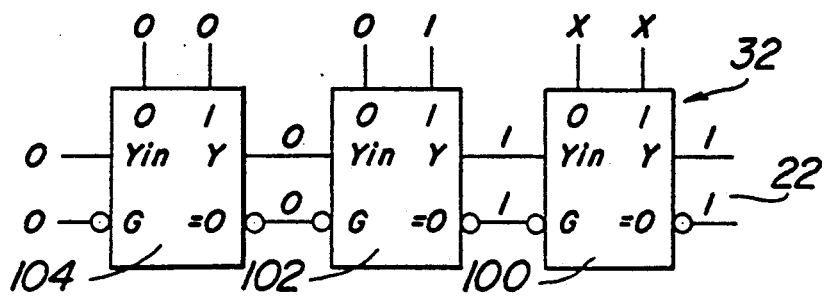
FIG. 4B

ASYNCHRONOUS LEADING ZERO COUNTER EMPLOYING ITERATIVE CELLULAR ARRAY

FIELD OF THE INVENTION

The present invention relates generally to a leading zero detector. More particularly, the present invention relates to an asynchronous leading zero counter employing an iterative cellular array.

BACKGROUND OF THE INVENTION

In computer systems, arithmetic operations are usually carried out in a memory, such as a register of an ALU. The memory in which the operand is stored usually has as many bit locations as would be required to store the largest possible number that the computer has been designed to operate upon. In many operations, however, the magnitude of the operand is substantially smaller than the magnitude of this largest number. In such case, the memory, or register, is filled with zeros to the left of the most significant bit of the operand that is a binary "1". These are known as leading zeros.

It is known that the speed at which arithmetic operations on the operand are performed can be increased if the number of leading zeros in the operand is known ahead of time. Leading zero detectors/counters for performing this function are well known in the art. Some leading zero detectors/counters employ synchronous circuitry for "normalizing" the operand. U.S. Pat. Nos. 3,234,368, 3,831,012, and 4,586,154 are exemplary. Generally, these systems employ some kind of a shifting or synchronous counting function to determine the location of the most significant "1" bit in the operand. Synchronous systems require clock driven shifters and/or counters and therefore detract from the computer's overall processing speed.

Other leading zero detectors/counters employ asynchronous circuitry for determining the number of leading zeros in the operand. U.S. Pat. Nos. 3,678,259, 4,106,105, and 4,247,891 are exemplary. Asynchronous circuitry for performing the leading zero count function is preferred because it does not detract from the computer's overall processing speed. However, known asynchronous leading zero detectors/counters are cumbersome and are not always easily implemented in a computer design. Moreover, known asynchronous leading zero detectors/counters are not easily expandable for use with ever widening bus architectures. A significant drawback of known leading zero detectors/counters, both synchronous and asynchronous, is that their design results in substantial overlap of signal lines interconnecting circuitry components. Thus, in the case of circuit implementations employing some type of metallization to effect the interconnections, such as would be the case in printed circuit board and integrated circuit (e.g., custom LSI) implementations, an expensive and/or complex construction having several insulated metallization layers is required.

It is therefore desirable to provide an asynchronous leading zero counter that is easily expandable to any bus width and wherein there is no crossover of any of the signal lines interconnecting any of the circuitry, but at the same time is simple in construction. The present invention achieves these goals.

SUMMARY OF THE INVENTION

A leading zero detector cell provided in accordance with the present invention is cascadable with a plurality of other cells of like kind to define an array that provides a digital output word having a magnitude indicative of the leading zero count on the inputs to the plurality of cells. Each cell comprises: a first data input (In0) to an asynchronous logic circuit for receiving a signal of the status of a bit; a second data input (In1) to the asynchronous logic circuit for receiving another signal indicative of the status of an immediately preceding, less significant bit; an enable input (G) to the asynchronous logic circuit for enabling/disabling the cell; a carry input (Yin) to the asynchronous logic circuit; a data output (Y) from the asynchronous logic circuit for providing an indication of leading zero count on the first and second data inputs (In0, In1); and, an enable output (In=0) from the asynchronous logic circuit for providing a first indication that both (i) the cell is enabled and (ii) the signals received on the first and second data inputs (In0, In1) both indicate binary 0, but otherwise providing a second opposite indication. The data output (Y) is responsive only to the status of the carry input (Yin) when the cell is disabled but is responsive to the status of the first and second data inputs (In0, In1) when the cell is disabled.

The array is defined by a plurality of cells defining at least one row, a first cell in the row being associated with two least significant bits of a bus (e.g., a bus carrying an input word to a register), a last cell in the row being associated with two most significant bits of the bus, and the remaining cells (if there are more than two in the row) being associated, in succession, with bit pairs of the bus therebetween. The data output and the enable output of all except the first cell are coupled to the carry input and enable input, respectively, of an immediately neighboring cell that is associated with two lower significant bits of the bus. The data output of the first cell is indicative of the least significant bit of the leading zero count. Depending upon the bus width (i.e., number of bits), additional rows of cells may be provided and interconnected to preceding rows as hereindescribed. The data output of the first cell of each succeeding row will be indicative of a more significant bit of the leading zero count.

According to one embodiment of the invention, the array is for use with a bus having $2^N$ bits and, the array is two dimensional and there are $2^N-1$ cells defining N successive rows of cells. Each row succeeding the first row contains only half the number of cells of the immediately preceding row, and the data output of the first cell of each row succeeding the first row is indicative of a higher significant bit of the leading zero count. The data outputs of each of the first cells of each row collectively define a digital word having a magnitude indicative of the leading zero count on the bus.

All bits on the bus are simultaneously input into the array in parallel fashion and its operation is completely asynchronous. The topology of the array results in no crossover of any signal lines interconnecting the cells.

BRIEF DESCRIPTION OF THE DRAWINGS

FIG. 1 illustrates the functional inputs and outputs of a leading row detector cell according to the present invention.

FIG. 2 is a truth table for the cell of FIG. 1.

FIG. 3 illustrates one design for an asynchronous logic circuit for implementing the cell of FIG. 1.

FIGS. 4A and 4B illustrate an exemplary array for a leading zero counter according to the present invention.

DETAILED DESCRIPTION OF THE INVENTION

Figure 5A:
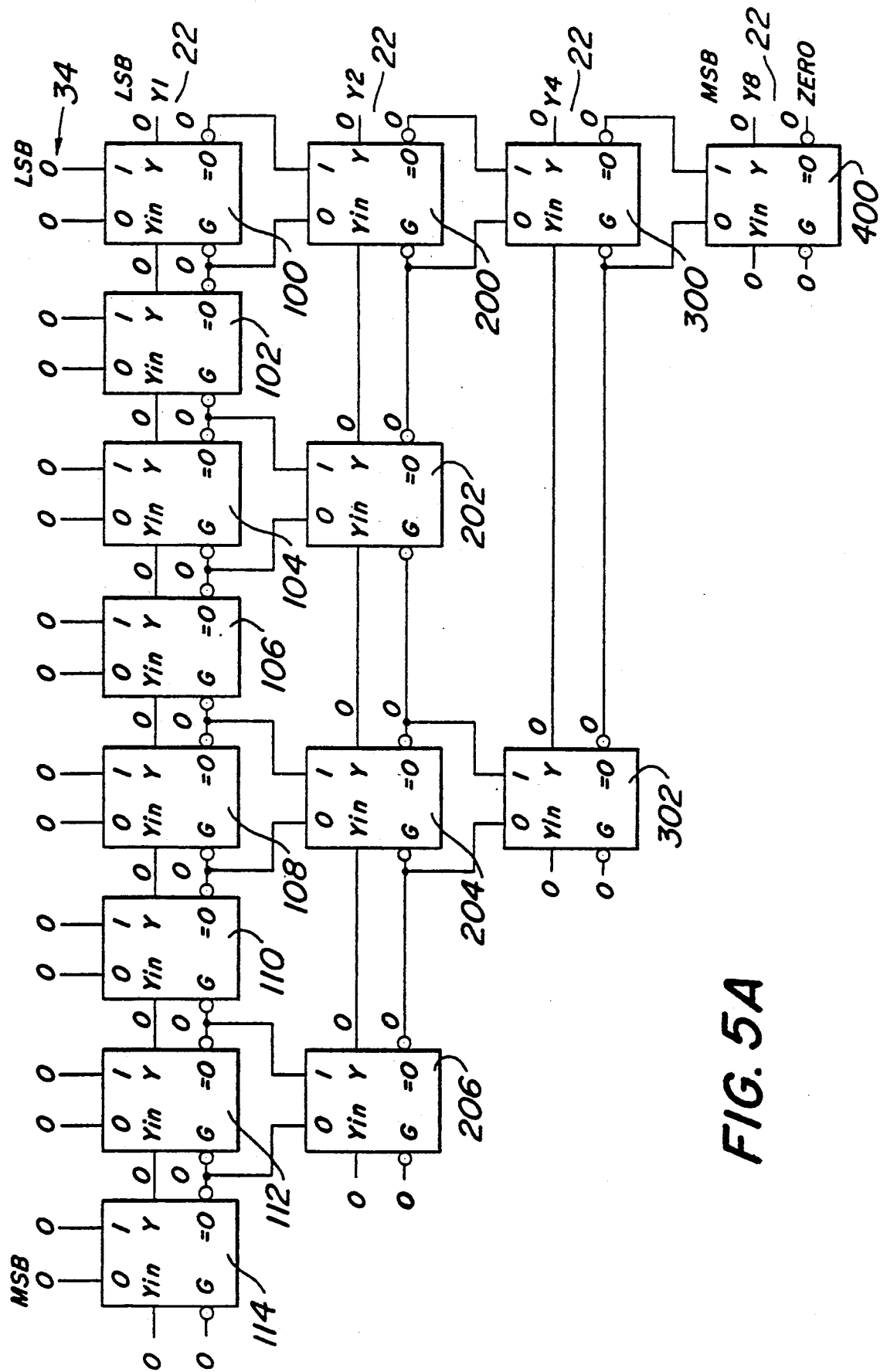
FIGS. 5A and 5B illustrate another exemplary array for another leading zero counter according to the present invention.

Referring now to the drawings, wherein like numerals represent like elements, there is illustrated in FIG. 1 a leading zero detector cell 10 according to the present invention. The cell 10 comprises a pair of digital data inputs 12, 14 (labeled In0, In1, respectively), an enable-/disable input 18 (labeled G) and a carry input 16 (labeled Yin). The cell also comprises a data output 22 (labeled Y) which is the primary functional output of the cell 10, and an enable output 20 (labeled In=0). The inputs/outputs preceeded with a "+" are active high, while those preceeded by a "−" are active low. As will become apparent hereinafter, the data input 12 is for coupling to a more significant bit of a bus (e.g., carrying an input word to a register) whose leading zero count is to be determined, while the data input 14 is for coupling to the immediately adjacent, next lower significant bit of the bus.

FIG. 2 illustrates the truth table for the cell 10 of FIG. 1. The "x's" in the truth table indicate "don't cares." The truth table of FIG. 2 illustrates that the data output 22 the data inputs 12, 14, respectively. The truth table of FIG. 2 also illustrates that, when the cell 10 is one of a plurality of like cells arranged in an array (described hereinafter), the data outputs 22 of all subsequent cells 10 (i.e., those associated with less significant bits) will be forced active upon detection of a binary "01" pattern on the data inputs 12, 14, respectively, and all subsequent cells 10 (again, those associated with less significant bits) will be disabled. The truth table further illustrates that, when a cell is disabled (i.e., when the input 18 is inactive or binary "1"), only the carry input 16 will affect the data output 22. The truth table still further illustrates that if a binary "11" or "10" is detected at the data inputs 12, 14, respectively, all subsequent cells 10 in the array will be disabled and the data output 22 for all subsequent cells will be forced inactive (binary "0"). The truth table finally illustrates that the enable output 20 is active (i.e., binary "0") when both a binary "00" appears on the data inputs 12, 14 and the enable input 18 is active (i.e., binary "0"). As will become apparent, when an array comprising a plurality of rows of cells 10 is constructed as described herein, the enable output 20 of a cell 10 in a preceding row serves as a data input to a cell in a succeeding row.

Preferably, the cell 10 is comprised of asynchronous logic circuitry. One asynchronous logic circuit for implementing the cell 10 is illustrated in FIG. 3. The asynchronous logic circuit of FIG. 3 includes two AND gates 24, 28 and an OR gate 26 connected as shown. Thus, the AND gate 24 has inverted inputs for receiving the data input 12 and enable input 18, and a non-inverted input for receiving the data input 14. The AND gate 28 has three inverted inputs for receiving the data inputs 12, 14 and the enable input 18. The AND gate 28 also has an inverted output for providing the enable output 20. The OR gate 26 has one input receiving the carry input 16 and another input receiving the output of AND gate 24. The output of OR gate 26 provides the data output 22.

Summarizing the function of the cell 10, (and as will be appreciated from the truth table of FIG. 2), the data output 22 is responsive only to the status of the carry input 16 when the cell is disabled, but the data output 22 is forced active when both the cell is enabled and a binary "01" is detected at the data inputs 12, 14, respectively. The data output 22 is rendered inactive when both the cell is enabled and a binary "10" or "11" is detected at the data inputs 12, 14, respectively. The enable output 20 provides a first indication (binary "0") that both (i) the cell is enabled and (ii) a binary "00" has been detected at the data inputs 12, 14. The enable output 20 provides a second, opposite indication (binary "1") at all other times.

It will thus be seen that, when the cell 10 is enabled, the data output 22 provides a bit that is indicative of the number of leading zeros at the data inputs 12, 14. A single cell, therefore, will process a two bit binary input word. The data output 22 will count zero or one leading "0's in the input word (e.g., the operand). If both bits of the word that is input to the cell 10 are binary "0's", then the data output 22 will be a binary "0" and the enable output 20 will be active (i.e., binary "0"), indicating that the input word is all "0's". A binary "01" at the data inputs 12, 14 will cause the data output 22 to be a binary "1", thus indicating one leading "0" A binary "11" or "10" at the data inputs 12, 14 will cause the data output 22 to be a binary "0", thus indicating no leading "0's"

As mentioned, each of the cells 10 may be combined with a plurality of like cells to form an iterative array for counting the number of leading zeros on an N bit bus. The construction and operation of such an array will now be described.

FIGS. 4A and 4B each illustrate an exemplary one-dimensional array, comprising three cells of the type of FIG. 1, designated 100, 102 and 104. The input word from the bus is labelled 30 for the example of FIG. 4A and 32 for the example of FIG. 4B. The cell 104 receives the two most significant bits of the bus or word 30, 32. The cell 100 receives the two least significant bits of the bus or word 30, 32, and the cell 102 receives the intermediate bits. The examples of FIGS. 4A and 4B are for a simple six-bit bus with the inputs as shown, and "x's" representing don't cares. As shown, the cells 100, 102, 104 are interconnected so that the data output 22 of cell 104 is supplied as the carry input 16 to the cell 102, and the data output 22 of cell 102 is provided as the carry input 16 to the cell 100. Similarly, the enable output 20 of cell 104 is provided as the enable input 18 to the cell 102, and the enable output 20 of cell 102 is provided as the enable input 18 to the cell 100. Data output 22 of the cell 100 (i.e., the first cell in the row) provides the indication of leading zero count. Thus, in the example of FIG. 4A, there are four leading zeros in the input word 30, and the data output 22 is a binary "0" In the example of FIG. 4B, there are three leading zeros in the input word 32, and the data output 22 is a binary "1" Thus, the data output 22 of the array of FIGS. 4A and 4B indicates whether there is an even or odd number of leading "0's" in the input word. Accordingly, the data output 22 of the arrays of FIGS. 4A and 4B can be considered as the least significant bit of the total count of leading "0's".

Figure 5B:
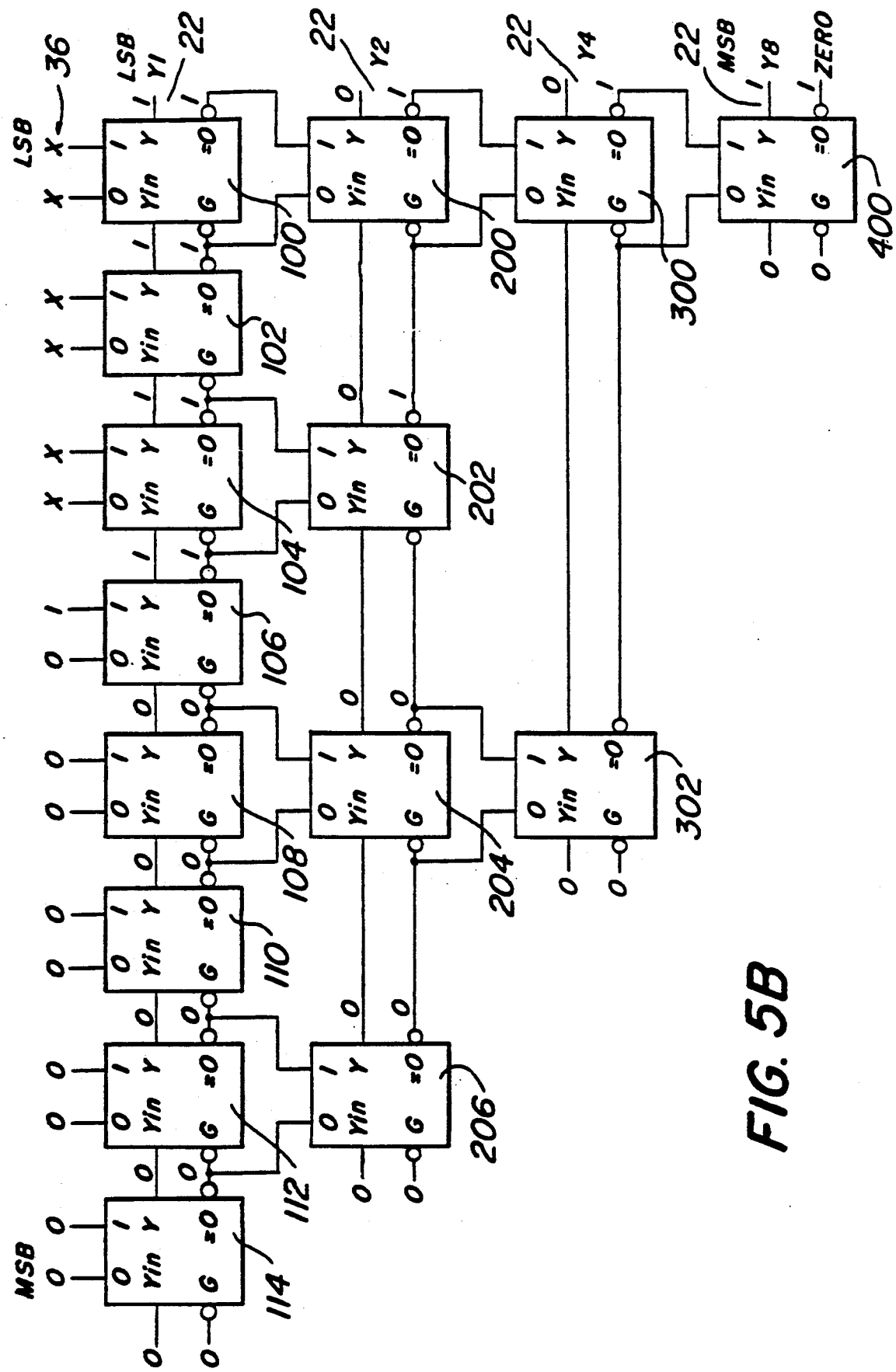

FIGS. 5A and 5B each illustrate a two-dimensional array for receiving an input word from a 16 bit bus. The input word from the bus is labeled 34 for the example of FIG. 5A and 36 for the example of FIG. 5B. As shown, the array of FIGS. 5A and 5B comprises four rows: the first row comprises cells 100–114 (cell 100 defining the first cell); the second row comprises cells 200–206 (cell 200 defining the first cell); the third row comprises the cells 300–302 (cell 300 defining the first cell); and, the fourth row comprises cell 400 (cell 400 being the only cell and thus defining the first and last cell of the fourth row). As also shown, the cell 114 receives as an input (at data inputs 12, 14) the two most significant bits of the input word, and the cell 100 receives on its inputs 12, 14, the two least significant bits of the input word. The remaining cells, 102–112, each receive as inputs, in succession, the remaining bit pairs of the input word, as shown. The first row of cells 100–114 of the array of FIGS. 5A and 5B is configured, and its cells are interconnected, in the manner described in connection with FIGS. 4A and 4B. It will be appreciated that the data output 22 of the first cell 100 of the first row will indicate whether there are an even or odd number of "0's" in the input word, and thus represents the least significant bit of the total count of leading "0's" in the input word.

The function of the succeeding rows, i.e., the second row (cells 200–206), third row (cells 300–302) and fourth row (cell 400) is to obtain the next more significant bit in the leading zero count. More particularly, the function of the second row (cells 200–206) is to count the pairs of "0's" (pair data) in the leading zero string of the input word. Thus, only half the number of cells in the first row are required to construct the second row. As illustrated, this pair data is obtained from the enable outputs 20 of the cells in the second row. Thus, the data inputs 12, 14 of each cell in the first row are coupled to receive the enable outputs 20 of adjacent pairs of cells in the first row. When the enable output 20 of any cell 200–206 in the second row is active (i.e., binary "0"), this is an indication that the data inputs 12, 14 for that cell, and thus the enable outputs 20 supplying those data inputs, are both binary "0's". It will be appreciated that the data output 22 of the first cell 200 of the second row of cells 200–206 will indicate the odd/even sense of the total count of "0" pairs in the input word. Thus, the data output 22 of the first cell 200 of the second row of cells indicates the second least significant bit of the total leading zero count.

The construction and operation of the third row of cells 300–302 and the fourth row of cell 400, is as set forth above. It will be appreciated that the data output 22 of the first cell 300 of the third row of cells 300, 302 will be indicative of the second most significant bit of the total leading zero count. Similarly, it will be appreciated that the data output 22 of the cell 400 comprising the fourth row will be indicative of the most significant bit of the total leading zero count. Accordingly, the data outputs 22 of the first cell of each row collectively define a data word whose magnitude is indicative of the total leading zero count.

In the example of FIG. 5A, there are no leading zeros in the input word 34, i.e., every bit in the input word is a binary "0" Accordingly, as shown, the magnitude of the digital output word is binary "0000" (decimal 0), indicating no leading zeros in the input word. In the example of FIG. 5B, there are nine leading zeros in the input word and, as shown, the magnitude of the data output word is binary "1001" which is a decimal "9".

From the foregoing, it will be appreciated that a plurality of cells 10 may be cascaded and interconnected as above described to define a leading zero counter for an input word of any width. The input word is supplied to the data inputs of the first row of cells, and each succeeding row has only half the number of cells as the immediately preceding row. The data output 22 of the first cell 100 of the first row of cells 100–114 provides an output indicative of the least significant bit of the leading zero count, while the data output 22 of the first cell of each succeeding row (i.e., cells 200, 300, 400) provide an output indicative of a more significant bit of the leading zero count. It will be appreciated that the last row will always comprise only one cell (e.g., cell 400), and that the enable output 20 of this cell serves as a zero indicator for the entire input word. For example, referring to FIG. 5A, the enable output 20 of the cell 400 is a binary "0", thus indicating that there are no leading zeros in the input word. In contradistinction, in the example of FIG. 5B, the enable output 20 of the cell 400 is a binary "1", indicating that there are leading zeros in the input word.

Although the leading zero counter array described above has application to a bus having any bit width, certain relationships may be defined when the bit width is a power of two. Thus, for a $2^N$ bit bus, it will be appreciated that the array will always comprise $2^N-1$ cells, and that there will always be N successive rows of cells, and the first row of cell wills always comprise $2^N/2$ cells. These relationships are illustrated in the examples of FIGS. 5A and 5B. Irrespective of the configuration, however, it will be appreciated from the drawings, and in particular FIGS. 4A, 4B, 5A and 5B, that the last cell of each row (i.e., cells 104 in FIGS. 4A and 4B, and cells 114, 206, 302 and 400 in FIGS. 5A and 5B) should have their carry inputs 16 and enable inputs 18 both tied to a source which represents a binary or logical "0".

An important feature of the invention is illustrated by FIGS. 4A, 4B, 5A and 5B. It will be noted that, due to the array topology, and in particular, the manner in which the cells 10 are cascaded and interconnected, there is no crossover of any signal lines connecting any of the cells 10. This feature of the invention simplifies implementation of the invention, particularly implementations employing some type of metallization to effect the interconnections. Thus, implementation of the invention on a printed circuit board or in an integrated circuit (e.g., a custom LSI chip) requires only one layer of metallization. In other words, several insulated layers of metallization are not required as in the prior art.

Another important feature of the invention is that all of the bits of the input word are supplied to the counter array in parallel, and the operation of the counter array is totally asynchronous. Accordingly, no machine cycles are wasted in processing the input word to determine the number of leading zeros.

The present invention may be embodied in other specific forms without departing from the spirit or essential attributes thereof and, accordingly, reference should be made to the appended claims, rather than to the foregoing specification, as indicating the scope of the invention.

I claim:

1. Leading zero detector comprising a cell including asynchronous logic circuitry having a pair of digital data inputs and a data output for providing an indication that a leading zero has been detected on the digital data inputs including a count of the number of leading zeros detected on the data inputs, the cell being cascadable with a selectable number of other like cells to incrementally increase a maximum count of the numbers of detected leading zeros.

2. Leading zero detector according to claim 1 wherein the asynchronous logic circuitry further has an enable/disable input and a carry input, the asynchronous logic circuitry rendering the data output responsive to only the carry input when the cell is disabled, but rendering the data output active upon detecting a binary 01 at the data inputs when the cell is enabled.

3. Leading zero detector according to claim 2 wherein the asynchronous logic circuit renders the data output inactive when both the cell is enabled and a binary 10 or 11 is detected at the data inputs.

4. Leading zero detector according to claim 4 further comprising an enable output from the asynchronous logic circuit, the asynchronous logic circuit rendering the enable output active when both the cell is enabled and a binary 00 is detected at the data inputs.

5. Leading zero detector according to claim 4 wherein, the cell is one of a plurality of cells cascaded in an array, and the array comprises a number of cells defining a first row having the data inputs coupled to sequential bits of a bus, and at least one succeeding row of cells, each succeeding row of cells having half the number of cells than the immediately preceding row, each cell except a first cell in each row having its data output coupled to the carry input of a next immediately neighboring cell in the same row, each cell in each of the succeeding rows having its data inputs coupled to the enable outputs of a pair of adjacent cells in the immediately preceding row, the data output of the first cell in each row collectively providing a digital word having a magnitude indicative of the number of leading zeros on the bus.

6. Leading zero detector array according to claim 5 wherein there is no crossover of any signal lines interconnecting the cells.

7. Leading zero detector array according to claim 5 wherein the bus has $2^N$ bits, and there are $N-1$ cells defining N rows.

8. Leading zero detector array according to claim 5 wherein the enable output of a last cell in the array is active when binary 0's are present on all data inputs of the first row of cells, and is inactive at all other times.

9. Leading zero counter cell comprising:
(a) a first data input (In0) to an asynchronous logic circuit for receiving a signal indicative of the status of a bit;
(b) a second data input (In1) to the asynchronous logic circuit for receiving another signal indicative of the status of an immediately preceding less significant bit;
(c) an enable input (G) to the asynchronous logic circuit for enabling/disabling the cell;
(d) a carry input (Yin) to the asynchronous logic circuit;
(e) a first output (Y) from the asynchronous logic circuit for providing an indication of leading zero count on the first and second data inputs (In0, In1), the first output (Y) being responsive only to the status of the carry input (Yin) when the cell is disabled but being responsive to the status of the first and second data inputs (In0, In1) when the cell is enabled; and,
(f) a second output (In=0) from the asynchronous logic circuit for providing a first indication that both (i) the cell is enabled and (ii) the signals received on the first and second data inputs (In0, In1) both indicate binary 0, but otherwise providing a second opposite indication; the cell being cascadable with a selectable number of other like cells to incrementally increase a maximum count of the number of detected heading zeros.

10. Leading zero counter cell according to claim 9 whereupon, when the signal received on the In0 input indicates a binary 1, the In=0 output provides the second indication and the Y output provides an indication that the leading zero count is zero.

11. Leading zero counter cell according to claim 9 wherein the Y and In=0 outputs are responsive to the In0, In1, Yin and G inputs according to the following truth table:

| G | Yin | In0 | In1 | Y | In=0 |
| --- | --- | --- | --- | --- | --- |
| 1 | 0 | x | x | 0 | 1 |
| 1 | 1 | x | x | 1 | 1 |
| 0 | 0 | 0 | 0 | 0 | 0 |
| 0 | 0 | 0 | 1 | 1 | 1 |
| 0 | 0 | 1 | x | 0 | 1 | where x is a "don't care."

12. Leading zero counter cell according to claim 9 wherein the asynchronous logic circuit comprises: a first AND gate having inverted inputs receiving the G and In0 inputs to the cell and a non-inverted input receiving the In1 input to the cell; a second AND gate having inverted inputs receiving the G, In0 and In1 inputs to the cell and having an inverted output providing the In=0 output from the cell; and, an OR gate having inputs receiving the Yin input to the cell and an output of the first AND gate, and having an output for providing the Y output from the cell.

13. Leading zero counter cell according to claim 9 wherein the In0, In1 and Yin inputs are active high inputs, the G input is an active low input, the Y output is an active high output and the In=0 output is an active low output.

14. Leading zero counter cell according to claim 9 wherein the cell is one of a plurality of cells interconnected in an array.

15. Leading zero counter cell array according to claim 14 wherein the array is defined by at least one row, a first cell in the row being associated with two least significant bits of a bus, a last cell being associated with two most significant bits of the bus, and the remaining cells being associated, in succession, with bit pairs of the bus therebetween, and the Y output and In=0 output of all except the first cell being coupled to the Yin input and G input, respectively, of an immediately neighboring cell that is associated with two lower significant bits of the bus, the Y output of the first cell being indicative of the least significant bit of the leading zero count.

16. Leading zero counter cell array according to claim 15 wherein there are $2^N$ bits in the bus, the array is two dimensional and the recited row defines a first row, there being a total of N rows of cells in the array including at least one row succeeding the first row, each row succeeding the first row containing only half of the number of cells of the immediately preceding row, the Y output of a first cell of each row succeeding the first row being indicative of a higher significant bit of the leading zero count.

17. Leading zero counter cell array according to claim 16 wherein the In0 and In1 inputs of each cell in the rows succeeding the first row are coupled to receive the In=0 outputs of a pair of cells in the immediately preceding row.

18. Leading zero counter cell array according to claim 16 wherein the number of cells in the array is $2^N-1$.

19. Leading zero counter cell array according to claim 16 wherein the Y outputs of the first cell of each row collectively provide a digital word having a magnitude indicative of the leading zero count on the bus.

20. Leading zero counter cell array according to claim 19 wherein the array operation is parallel and asynchronous.

21. Leading zero counter cell array according to claim 16 wherein the In=0 output of at last cell in the array provides the first indication when binary 0's are present on all In0 and In1 inputs of the first row of cells, and provides the second indication at all other times.

22. Leading zero counter cell array according to claim 14 wherein there is no crossover of signal lines interconnecting the cells of the array.

23. Apparatus for providing an indication of leading zero count on a $2^N$ bit bus comprising a plurality, $2^N-1$, of cascaded asynchronous zero detector cells defining N rows, a first row being defined by a number $2^N/2$ of zero detector cells coupled to receive all of the bits of the bus and provide an output indicative of a least significant bit of the leading zero count, each succeeding row being defined by half of the number of zero detectors in the immediately preceding row, each zero detector cell in each succeeding row being coupled to receive an output of a pair of zero detectors in the immediately preceding row, each succeeding row providing an output indicative of a more significant bit of the leading zero count, the outputs from the N rows collectively defining a digital word having a magnitude indicative of the leading zero count.

24. Apparatus according to claim 23 there is no crossover of signal lines interconnecting the cells.

25. Apparatus according to claim 23 wherein each zero detector cell comprises:
(a) a first data input (In0) for receiving a signal indicative of the status of a bit, the first data input (In0) of each cell in the first row being coupled to receive a bit of the bus;
(b) a second data input (In1) for receiving another signal indicative of the status of a neighboring bit, the second data input (In1) of each cell in the first row being coupled to receive an immediately preceding less significant bit of the bus than the first data input (In0);
(c) an enable input (G) for enabling/disabling the cell;
(d) a carry input (Yin);
(e) a first output (Y) for providing an indication of leading zero count on the first and second data inputs (In0, In1), the first output (Y) being responsive only to the status of the carry input (Yin) when the cell is disabled but being responsive to the status of the first and second data inputs (In0, In1) when the cell is enabled; and,
(f) a second output (In=0) for providing a first indication that both (i) the cell is enabled and (ii) the signals received on the first and second data inputs (In0, In1) both indicate binary 0, but otherwise providing a second opposite indication.

26. Apparatus according to claim 25 wherein the Y and In=0 outputs are responsive to the In0, In1, Yin and G inputs according to the following truth table:

| G | Yin | In0 | In1 | Y | In=0 |
|---|-----|-----|-----|---|------|
| 1 | 0 | x | x | 0 | 1 |
| 1 | 1 | x | x | 1 | 1 |
| 0 | 0 | 0 | 0 | 0 | 0 |
| 0 | 0 | 0 | 1 | 1 | 1 |
| 0 | 0 | 1 | x | 0 | 1 | where x is a "don't care."

27. Apparatus according to claim 26 wherein the In0 and In1 inputs of each cell in the rows succeeding the first row are coupled to receive the In=0 outputs of a pair of cells in the immediately preceding row.

28. Apparatus according to claim 25 wherein the In=0 output of a last cell in the array provides the first indication when binary 0's are present on all In0 and In1 inputs of the first row of cells, and provides the second indication at all other times.

29. Asynchronous leading zero counter for a bus comprising a plurality of cascaded zero detector cells arranged in an array, each zero detector cell having first and second data inputs (In0,In1), and a primary functional output (Y), a plurality of the cells defining a first row of the array and each having its In0 input coupled to receive one bit of the bus and its In1 input coupled to receive an immediately preceding less significant bit of the bus, a first of the cells of the first row being associated with two least significant bits of the bus, a last of the cells of the first row being associated with two most significant bits of the bus, and the remaining cells being associated, in succession, with bit pairs of the bus therebetween, the Y output of the first cell of the first row providing an output indicative of a least significant bit of the leading zero count, a plurality of additional cells defining succeeding rows, each succeeding row being defined by half the number of cells in the immediately preceding row, the In0 and In1 inputs of each cell in each succeeding row being coupled to receive outputs of a pair of cells in the immediately preceding row, the Y output of the first cell of each succeeding row providing an output indicative of a more significant bit of the leading zero count, the Y outputs of the first cell of each row collectively providing a digital word having a magnitude indicative of leading zero count.

30. Asynchronous leading zero counter according to claim 29 wherein each cell further comprises an enable input (G), a carry input (Yin) and an enable output (In=0), and the In0 and In1 inputs of each cell in each succeeding row are coupled to receive the In=0 outputs of adjacent pairs of cells in the immediately preceding row, and the Y output and In=0 output of each cell, except the first cell in each row, is coupled to the Yin input and G input, respectively, of an immediately neighboring cell in the row that is associated with two lower significant bits of the bus.

31. Asynchronous leading zero counter according to claim 30 wherein the Y output is responsive to only the Yin input when the G input disables the cell but is responsive to the In0 and In1 inputs when the G input enables the cell.

32. Asynchronous leading zero counter according to claim 31 wherein:
(a) upon the presence of a binary 01 on the inputs In0, In1, respectively, of any of the cells, the Y outputs of all cells associated with less significant bits are forced to an active state and those cells are disabled; and, (b) upon the presence of a binary 1 on the input In0, the Y outputs of all cells associated with less significant bits are forced to an inactive state and those cells are disabled.

33. Asynchronous leading zero counter according to claim 30 wherein the enable output of a last cell in the array is active when binary 0's are present on all data inputs of the first row of cells, and is inactive at all other times.

34. Asynchronous leading zero counter according to claim 29 wherein there are $2^N$ bits in the bus, $2^N-1$ cells and N rows of cells in the array.

35. Asynchronous leading zero counter according to claim 29 wherein there is no crossover of signal lines coupling the cells of the array.

* * * * *